(12) United States Patent
Bergfeld et al.

(10) Patent No.: US 11,073,222 B2
(45) Date of Patent: Jul. 27, 2021

(54) ELECTROMAGNETIC SOLENOID VALVE

(71) Applicant: Kendrion (Villingen) GmbH, Villingen-Schwenningen (DE)

(72) Inventors: Björn Bergfeld, Balingen-Endingen (DE); Joachim Flühs, Villingen-Schwenningen (DE); Frank Zelano, St. Georgen (DE); Wolfgang Bürk, Villingen-Schwenningen (DE)

(73) Assignee: Kendrion (Villingen) GmbH, Villingen-Schwenningen (DE)

( * ) Notice: Subject to any disclaimer, the term of this patent is extended or adjusted under 35 U.S.C. 154(b) by 0 days.

(21) Appl. No.: 15/765,562

(22) PCT Filed: Sep. 28, 2016

(86) PCT No.: PCT/EP2016/073116
§ 371 (c)(1),
(2) Date: Apr. 3, 2018

(87) PCT Pub. No.: WO2017/060141
PCT Pub. Date: Apr. 13, 2017

(65) Prior Publication Data
US 2019/0078701 A1 Mar. 14, 2019

(30) Foreign Application Priority Data
Oct. 5, 2015 (DE) .................... 10 2015 116 909.6

(51) Int. Cl.
*F16K 31/06* (2006.01)
*F16K 1/36* (2006.01)
(Continued)

(52) U.S. Cl.
CPC ............ *F16K 31/0693* (2013.01); *F16K 1/36* (2013.01); *F16K 1/38* (2013.01); *F16K 1/44* (2013.01);
(Continued)

(58) Field of Classification Search
CPC ... F16K 1/36; F16K 1/38; F16K 1/385; F16K 31/0651; F16K 31/0693
(Continued)

(56) References Cited

U.S. PATENT DOCUMENTS 3,684,238 A * 8/1972 Michellone ......... F16K 31/0658
251/129.07
5,791,628 A * 8/1998 Wolff ...................... B60T 8/363
251/129.07
(Continued)

FOREIGN PATENT DOCUMENTS

DE 19604316 2/1996
DE 10200915 10/2002
(Continued)

OTHER PUBLICATIONS

The State Intellectual Property Office of the People's Republic of China, "First Office Action," and English translation thereof, issued for Chinese patent application No. 201680057753.3, dated Dec. 26, 2018, document of 16 pages.
(Continued)

*Primary Examiner* — Seth W. MacKay-Smith
(74) *Attorney, Agent, or Firm* — Akerman LLP; Peter A. Chiabotti

(57) ABSTRACT

An electromagnetic switch valve for opening or closing an oil or coolant circuit in a motor vehicle, having an electromagnet, which has a coil and a movable armature, wherein the armature is coupled to a valve element, via which a valve seat in the coolant circuit can be sealed, wherein the switch valve is designed to be pressure balanced, and the valve element, pointing in the direction of the valve seat, is designed to be at least approximately hollow-walled.

16 Claims, 1 Drawing Sheet

(51) Int. Cl.
  *F16K 1/38* (2006.01)
  *F16K 1/46* (2006.01)
  *F16K 27/02* (2006.01)
  *F16K 1/44* (2006.01)
  *F16K 31/08* (2006.01)

(52) U.S. Cl.
  CPC .............. *F16K 1/46* (2013.01); *F16K 27/029* (2013.01); *F16K 31/0651* (2013.01); *F16K 31/0675* (2013.01); *F16K 31/0613* (2013.01); *F16K 31/082* (2013.01)

(58) Field of Classification Search
  USPC .......................................... 251/129.07, 129.21
  See application file for complete search history.

(56) References Cited

U.S. PATENT DOCUMENTS

| | | | | |
|---|---|---|---|---|
| 6,098,955 | A * | 8/2000 | Ruiz | F16K 1/36 251/120 |
| 6,152,420 | A * | 11/2000 | Hohl | B60T 8/363 251/129.02 |
| 6,601,786 | B2 * | 8/2003 | Yamaguchi | F02M 51/0682 239/533.9 |
| 6,976,665 | B2 * | 12/2005 | Seitz | B60T 8/363 251/129.02 |
| 7,588,229 | B2 * | 9/2009 | Eiser | B60T 8/363 251/129.02 |
| 7,730,875 | B2 * | 6/2010 | Mori | F02M 59/34 123/446 |
| 7,857,282 | B2 * | 12/2010 | Goossens | B60T 8/363 251/129.02 |
| 7,878,480 | B2 * | 2/2011 | Vattaneo | F01L 9/025 251/129.02 |
| 8,328,157 | B2 * | 12/2012 | Schulz | B60T 8/363 251/129.07 |
| 8,387,946 | B2 * | 3/2013 | Itoafa | F16K 31/0693 251/129.02 |
| 8,757,585 | B2 | 6/2014 | Bill et al. | |
| 8,944,405 | B2 * | 2/2015 | Manther | F16K 31/0658 251/129.21 |
| 2002/0079472 | A1 | 6/2002 | Kumar | |
| 2004/0041112 | A1 * | 3/2004 | Goossens | B60T 8/363 251/129.07 |
| 2006/0124882 | A1 | 6/2006 | Goossens | |
| 2006/0231785 | A1 * | 10/2006 | Hans | F16K 31/0651 251/129.21 |
| 2006/0261301 | A1 | 11/2006 | Eiser et al. | |
| 2013/0099144 | A1 | 4/2013 | Buse et al. | |

FOREIGN PATENT DOCUMENTS

| | | | | |
|---|---|---|---|---|
| DE | 10258859 | | 7/2004 | |
| DE | 10332345 | | 8/2004 | |
| DE | 102005049122 | | 10/2006 | |
| DE | 102005061509 | | 11/2006 | |
| DE | 102008030454 | | 12/2009 | |
| DE | 102008063933 | | 7/2010 | |
| DE | 102010025171 | | 12/2011 | |
| EP | 2825800 | B1 * | 4/2020 | .............. F16J 15/46 |
| RU | 43915 | | 2/2005 | |

OTHER PUBLICATIONS

Patent Cooperation Treaty, "International Search Report," and translation thereof, issued in International Application No. PCT/EP2016/073116, by European Searching Authority, document of 6 pages, dated Dec. 7, 2016.

* cited by examiner

ELECTROMAGNETIC SOLENOID VALVE

CROSS REFERENCE TO RELATED APPLICATIONS

This application is a § 371 National Phase of PCT/EP2016/073116, filed Sep. 28, 2016, the entirety of which is incorporated by reference and which claims priority to German Patent Application No. 10 2015 116 909.6, filed Oct. 5, 2015.

BACKGROUND

The invention application relates to an electromagnetic solenoid valve for opening and closing an oil or coolant circuit, for example, in a motor vehicle having the features and structures described herein.

Such electromagnetic solenoid valves are adequately known and have available an electromagnet which has a winding and a movable armature. The armature is coupled with a valve element, by which a valve seat in the coolant circuit can be closed and sealed when the winding is energized, while the valve seat is kept open when the winding is not energized. This state is designated as "normally open" in electromagnetic solenoid valves. Such electromagnetic solenoid valves are especially used in oil circuits of motor vehicle engines, to quickly bring the engine to operating temperature. Thus, upon starting the engine, the excitation winding of the electromagnetic solenoid valve is excited, so that the valve seat is closed and the vehicle oil in the engine can be heated relatively quickly. If this oil has reached the operating temperature, the electromagnetic solenoid valve is de-energized, and the valve seat is released, so that via the piston spray nozzles the engine pistons can be cooled. Overall, use of such electromagnetic solenoid valves in motor vehicle engines results in energy savings and reduction in emissions during cold starts.

However, electromagnetic solenoid valves used previously have been characterized by a relatively heavy design, which in addition is relatively large and thus demanding of much space.

It is here that the present application finds application.

The present disclosure provides an electromagnetic solenoid valve for opening or closing in an oil or coolant circuit of a motor vehicle, which, in comparison with previously known electromagnetic solenoid valves, is designed to be considerably smaller in this application, has a lower weight and exhibits high performance in regard to its behavior during the entire stroke of the valve element.

Such an electromagnetic solenoid valve is provided with the features and structures described herein.

This electromagnetic solenoid valve consequently is characterized in that the solenoid valve is configured to be pressure-equalized and that the valve element of the solenoid valve, pointing in the direction of the valve seat, is configured to be at least approximately hollow-walled.

This is advantageous, because through the pressure equalization a pressure equalization force proportional to the pressure active over the entire valve stroke, thus supporting the opening of the valve, the opening forces with the sealing element not designed with hollow walls being however dependent on valve stroke, so that despite being energized they could not be fully lifted from the valve seat, because the fluid forces appearing in operation generate closing forces which attempted in the area of its end setting to reset into the idle position, so that overall no one-hundred-percent open setting of the valve could be achieved.

Through these two measures it is possible to design the solenoid valve to be significantly smaller, with the fluid forces appearing in the coolant circuit during operation not resulting in the valve element being pulled automatically in the direction of the valve seat due to a produced excess pressure. This is achieved in that the surface of the valve element situated in the flow area is situated shifted back toward the actual valve seat.

Advantageous embodiments of the present application are further disclosed herein.

In one development of the present disclosure, the valve element, in the direction of the valve seat, can be configured to be at least roughly pot-shaped or at least roughly concave. Also, particularly within the scope of the invention is that the valve element is configured as a hollow sphere segment, with the cavity of this hollow sphere segment pointing in the direction of the valve seat. Any other hollow-walled configuration of the valve element is likewise suitable.

In another development of the present disclosure, the valve element is connected with a valve element tappet, which in turn is coupled with the armature of the electromagnet. In the simplest case, the valve element and the valve element tappet can be configured as a single piece and especially, to reduce weight, also consist of plastic or other light materials, such as aluminum. With this, configuring the valve element as an injection-molded piece suggests itself.

The end of the valve tappet facing away from the armature is connected for this with a valve element base, from which a surrounding valve element collar projects in the direction of the valve seat. The valve element collar is provided for sealing on the valve seat, and there adjoins in a suitable manner.

In one embodiment of the present disclosure, the valve element collar, on its surrounding edge that faces toward the valve seat, is slanted or rounded and configured as a spherical cap section. It is especially slanted or rounded in such a way that the inner surrounding edge in the thus pot-shaped configured valve element turns back outward to the outer edge of the valve element with a radius and there is shorter.

To configure the electromagnetic solenoid valve according to the present disclosure in pressure-equalized fashion, within the electromagnetic solenoid valve, thus within its housing, an axial through-running borehole must be provided, which serves as a pressure equalization borehole and impinges with the pressurized medium on a pressure equalization space at a side of the armature which is opposite the valve element. Here what suggests itself is that the valve element along its entire length, thus the valve element and a possibly pertaining valve element tappet, has a through-running borehole, especially an axial one. This axial through-running borehole is appropriately connected with a through-running hole of the armature along its entire length, so that the above-mentioned pressure equalization results.

In one embodiment of the present disclosure, the electromagnetic solenoid valve has available a spring device, through which the valve element, in a non-energized state of the solenoid valve, is kept in a setting ("normally open") that opens the valve seat.

Due to the fact that the electromagnetic solenoid valve according to the present disclosure is pressure-equalized and the valve element collar is designed in the manner described, the electromagnetic solenoid valve can achieve a reduction in space occupied. In connection with the circumstance that in the electromagnetic solenoid valve according to the present disclosure, the contour of the valve element facing the valve seat is especially configured, what is additionally achieved is that despite smaller dimensioning of the spring force of the spring device, the valve element in the non-energized state of the winding can be completely held in its open setting. The consequence is outstanding performance of the switching behavior of the electromagnetic solenoid valve.

Installation of the electromagnetic solenoid valve according to the present disclosure in an engine block of a motor vehicle suggests itself. For this, the valve seat is installed in the engine block of the motor vehicle, with the electromagnetic solenoid valve held in or on the engine block, especially being screwed in, so that the valve element of the solenoid valve can securely seal the valve seat placed there.

Although until now mention has only been made that the electromagnetic solenoid valve can be installed in the oil circuit of a motor vehicle, naturally it is also within the scope of the present disclosure that such installation can also be made in another coolant circuit of a motor vehicle, for example in the coolant water circuit of the vehicle.

BRIEF DESCRIPTION OF THE DRAWINGS

The electromagnetic solenoid valve of the present application is explained in what follows in connection with two figures using a specific embodiment. Shown are.

If nothing otherwise is indicated, identical reference symbols designate identical parts in FIGS. 1 and 2, and have the same meaning.

DETAILED DESCRIPTION

Figure 1:
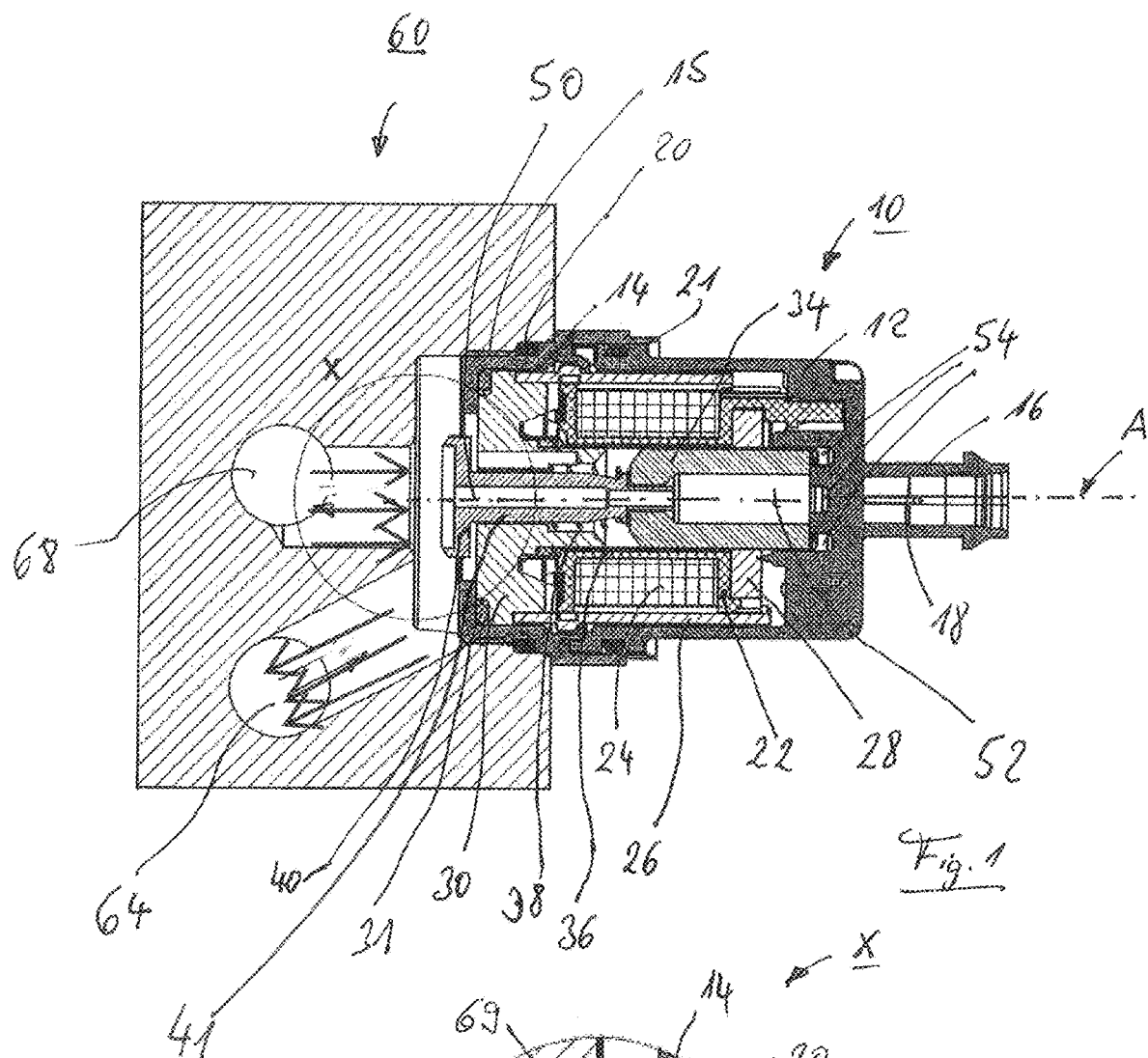
FIG. 1: a section view through the embodiment of an electromagnetic solenoid valve according to the present disclosure.

FIG. 1 shows a section view of an electromagnetic solenoid valve 10, which has available a rear housing part 12 and a front housing part 14. Front housing part 14 preferably consists of aluminum, but can also be manufactured out of plastic. The rear housing part preferably consists of plastic. They are configured to be tube-shaped and are connected in suitable fashion with each other, for example crimped, or if both housing parts are made of plastic, bonded. The two parts of the housing are sealed with each other by an O-ring 21. Front housing part 14 has available a threading 15, by which it is screwed into an opening of an engine block 60. This front housing part 14 is also sealed via an O-ring 20 toward the engine block of the motor vehicle. On the end of the rear housing part 12 that is shown at right in FIG. 1, a plug flange 16 adjoins the rear housing part 12, within which contact pins 18 are placed and through which a winding 24 seated in the interior of the two housing parts 12, 14 is contacted.

The winding 24 is wound concentrically about an axis A of the electromagnetic solenoid valve and sits on a winding carrier 22, which in a preferred way and means consists of plastic. The winding carrier is provided with reference symbol 22. In the tube-shaped opening of winding carrier 22 there is a sliding bushing 36 with a constant inner diameter, which will be dealt with in greater detail farther below.

For formation of a magnetic circuit, winding carrier 22 is surrounded on its outer circumference by a metallic cylinder 26. Additionally, to the right of winding 22 there is a metallic backing plate 28. To the left of winding 22 there is a pole core 30, which has an at least approximately central opening with a diameter which corresponds roughly to the inner diameter of the above-mentioned sliding bushing 36.

The inner opening of pole core 30 and the inner opening of sliding bushing 36 serve to admit an armature 34 as well as a valve element 40 that preferably is connected in fixed fashion with armature 34. Armature 34 consists of magnetically conducting material, especially of metal, while valve element 40 and a valve element tappet 41 attached in one piece thereon can be formed, made of plastic, preferably as an injection-molded piece, for weight reduction. Valve element tappet 41 is for example screwed onto armature 34 for this, or connected in fixed fashion in some other suitable way and means.

However, valve element tappet 41 and armature 34 can also be provided with no loose connection. This has an advantage in that angular errors between the armature bearing and valve set can more easily be compensated, and the valve element collar fits more easily into the valve seat. However, for this a seal is necessary between armature 34 and valve element tappet 41, so that no increased leakage appears. This can preferably be done via a special sealing geometry on the connection of valve element tappet 41, which adjoins on armature 34, preferably via a slightly conical front surface of the connection or via an additional sealing element such as one made of elastomer.

Additionally, the electromagnetic solenoid valve 10 depicted in FIG. 1 has available a spring device 38, which with its left end depicted in FIG. 1, is braced on a surrounding projection of pole core 30 and with its other end is braced on a flange-like projection of valve element tappet 41. The spring device ensures that in the non-energized state of winding 24, valve element 40 along with valve element tappet 41 and armature 34. attached in fixed fashion, is compressed into its end position depicted in FIG. 1.

As the figure also shows, pole core 30 is sealed via an additional O-ring 31 toward front housing piece 14 of the solenoid valve.

Figure 2:
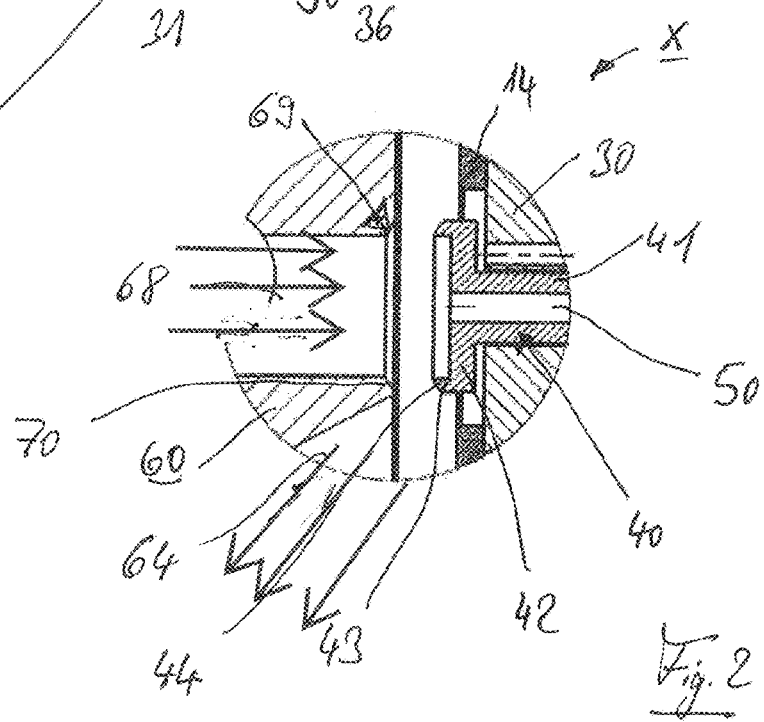
FIG. 2: the detail designated by "x" in FIG. 1 in the area of the valve seat and of the valve element, wherein both in FIG. 1 and FIG. 2 the de-energized state of the electromagnetic solenoid valve, thus its opened state, is shown.

Valve element 40, as is clearly shown in FIG. 2 in the enlarged detail X from FIG. 1, is in the non-energized state of solenoid valve 10 at a distance from an annular encircling valve seat 69 within the engine block. Encircling valve seat 69 is slanted to an intake 68, which is provided in engine block 60 for intake of a coolant, especially an oil. Valve element 60 is provided for sealing of this valve seat 69. In the open state of the solenoid valve shown in FIG. 1, the coolant via intake 68 reaches an outlet 64. Arrows, with their arrow directions, illustrate the motion of the coolant in intake 68 and outlet 64.

As can be seen especially well from FIG. 2, valve element 40 is still arched and configured in retracting motion or is pot-shaped toward valve seat 69. For this, in the embodiment depicted, valve element 40 has a valve element base 42, from which, on its outer edge a valve element collar 43 extends in the direction of valve seat 69 and projects out to valve seat 69. With this, the edge of valve element collar 43 that faces valve seat 69 is slanted, preferably supplied with a radius which interplays with the angle of slant on valve seat 69 for sealing, and thus also at an angular offset between valve element tappet and valve seat, makes possible a reliable sealing via linear contact. Thus. base 42 is placed set-back to valve seat 69 to a plane that lies orthogonal to axis A. which, when the electromagnetic solenoid valve is in operation, results in no more reduced pressure appearing and the valve element in its non-energized state tends to pull in the direction of valve seat 69.

The electromagnetic solenoid valve shown in FIGS. 1 and 2 is additionally configured with pressure equalization. For this, valve element 40 and valve element tappet 41 have available a through-running borehole 50, which makes a transition to a through-running borehole 52 of armature 34 and connects equalization spaces 54 to the right of armature 34 in FIG. 1 with the medium of the oil circuit. Therefore, a medium deriving from intake 68 in the entire electromagnetic solenoid valve adjoins within in through-running boreholes 51, 52 and also in the equalization spaces 54. through which, in the interior of solenoid valve 10. the same pressure prevails as in intake 68. Through this pressure equalization, the spring device 38 can be provided with markedly smaller dimensions in comparison to customary solenoid valves.

The advantage of such an electromagnetic solenoid valve as per FIGS. 1 and 2 is that it is designed to be relatively small.

LIST OF REFERENCE SYMBOLS

10 Electromagnetic solenoid valve
12 Housing part
14 Housing part
15 Threading
16 Plug flange
18 Contact pins
20 O-ring
21 O-ring
22 winding carrier
24 winding
26 metallic cylinder
28 backing plate
30 pole core
31 O-ring
34 armature
36 sliding bushing
38 spring device
40 valve element
41 valve element tappet
42 valve element base
43 valve element collar
44 valve element edge
50 through-running borehole
52 through-running borehole
54 equalization spaces
60 engine block
64 drain
68 intake
69 valve seat
70 valve seat edge
A axis
X detail

The invention claimed is:

1. An electromagnetic solenoid valve for opening or closing an oil or coolant circuit in a motor vehicle with an electromagnet, comprising:
 a winding;
 a movable armature;
 wherein the armature is coupled with a valve element with a valve seat that closes the coolant circuit, wherein the solenoid valve is configured to be pressure-equalized, and that the valve element pointing towards the valve seat is recessed;
 wherein the valve element has a valve element tappet coupled with the armature, wherein the valve element tappet has a valve element base facing away from the armature, wherein the valve element base has a surrounding valve element collar that projects forward toward the valve seat;
 wherein valve element and the valve element tappet are made of one piece;
 wherein the valve element, the valve element tappet and the armature have an axial through-running borehole that serves as a pressure equalizing borehole and the axial through-running borehole connects the valve element base with a pressure equalizing space;
 wherein the pressure equalizing space is positioned at a single side of the armature facing away from the valve element and is enclosed by the side of the armature facing away from the valve element and a rear housing part;
 wherein the valve seat is located in an engine block of the motor vehicle and the solenoid valve is screwed in the engine block;
 wherein the armature and the valve element tappet are connected with each other loosely and angular errors between an armature bearing and the valve seat can be compensated by a compensation movement to fit the valve element collar into the valve seat; and
 wherein a seal is arranged between the armature and the valve element tappet.

2. The electromagnetic solenoid valve of claim 1, wherein the valve element pointing towards the valve seat is configured to be pot-shaped or concave.

3. The electromagnetic solenoid valve of claim 1, wherein the seal comprises:
 a sealing geometry on a connection of the valve tappet, which adjoins on the armature; or an additional sealing element.

4. The electromagnetic solenoid valve of claim 3, wherein the valve element collar has a surrounding edge facing the valve seat, and wherein the valve element collar is slanted or rounded.

5. The electromagnetic solenoid valve of claim 1, wherein the valve element is formed from an injection-molded plastic.

6. The electromagnetic solenoid valve of claim 1, wherein the valve element has a through-running axial borehole.

7. The electromagnetic solenoid valve of claim 1, wherein the armature along its entire length has a through-running borehole.

8. The electromagnetic solenoid valve of claim 1, wherein the solenoid valve has a pressure equalization space on a side of the armature facing away from the valve element.

9. The electromagnetic solenoid valve of claim 1, wherein the solenoid valve has a spring device, through which the valve element in a de-excited state of the solenoid valve is held in a setting that retracts the valve element to open the coolant circuit.

10. An engine block of a motor vehicle with an electromagnetic solenoid valve secured on or in the engine block of claim 1, wherein the solenoid valve is arranged in the oil circuit of the motor vehicle.

11. An pressure equalized electromagnetic solenoid valve, comprising:
 a winding seated in a housing of a solenoid valve for opening or closing an a coolant circuit in a motor vehicle;
 a valve element having a valve element tappet and valve element base, the valve element base comprising a collar located at the perimeter of the valve element base and projecting outward, the valve element configured to seat the collar against a valve seat, wherein the coolant circuit is closed when the valve element seats against the valve seat;
 a movable armature;

wherein valve element and the valve element tappet are made of one piece;

wherein the valve element, the valve element tappet and the armature have an axial through-running borehole that serves as a pressure equalizing borehole and the axial through-running borehole connects the valve element base with a pressure equalizing space;

wherein the pressure equalizing space is positioned at a single side of the armature which is opposite to the valve element and is enclosed by the side of the armature facing away from the valve element and a rear housing part;

wherein the valve seat is located in an engine block of the motor vehicle and the solenoid valve is screwed in the engine block;

wherein the armature and the valve element tappet are connected with each other loosely and angular errors between an armature bearing and the valve seat can be compensated by a compensation movement to fit the valve element collar into the valve seat; and wherein a seal is arranged between the armature and the valve element tappet.

12. The pressure equalized electromagnetic solenoid valve of claim 11, wherein the collar comprises a slanted outer edge and the slanted outer edge of the valve collar is configured to seat against a slanted surface of the valve seat.

13. The pressure equalized electromagnetic solenoid valve of claim 11, further comprising a pressure equalization space on a side of the armature facing away from the valve element.

14. The pressure equalized electromagnetic solenoid valve of claim 11, further comprising a spring device biased to de-seat the valve element from the valve seat when operating in a de-excited state.

15. An electromagnetic solenoid valve, comprising:

a housing of a solenoid valve for opening or closing a coolant circuit in a motor vehicle;

a valve element coupled to the housing and having a valve element tappet and valve element base, the valve element base comprising a collar located at the perimeter of the valve element base and projecting outward, wherein the collar comprises a slanted outer edge and the slanted outer edge of the valve collar is configured to seat against a slanted surface of a valve seat, wherein the valve element is configured to seat the collar against the valve seat, wherein the coolant circuit is closed when the valve element seats against the valve seat when operating in an excited state;

a movable armature;

wherein valve element and the valve element tappet are made of one piece;

a spring device biased to de-seat the valve element from the valve seat when operating in a de-excited state;

wherein the valve element, the valve element tappet and the armature have an axial through-running borehole that serves as a pressure equalizing borehole and the axial through-running borehole connects the valve element base with a pressure equalizing space;

wherein the pressure equalizing space is positioned at a single side of the armature which is opposite to the valve element and is enclosed by the side of the armature facing away from the valve element and a rear housing part;

wherein the armature and the valve element tappet are connected with each other loosely and angular errors between an armature bearing and the valve seat can be compensated by a compensation movement to fit the valve element collar into the valve seat; and wherein a seal is arranged between the armature and the valve element tappet.

16. The pressure equalized electromagnetic solenoid valve of claim 15, further comprising a pressure equalization space on a side of the armature facing away from the valve element.

* * * * *